US009888663B2

(12) United States Patent
Hansen et al.

(10) Patent No.: US 9,888,663 B2
(45) Date of Patent: *Feb. 13, 2018

(54) AUTOMATED CLUSTER REMOVER

(71) Applicant: Technologies Holdings Corp., Houston, TX (US)

(72) Inventors: Ejvind D. Hansen, Odense (DK); Joergen Frederiksen, Faaborg (DK)

(73) Assignee: Technologies Holdings Corp., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/603,532

(22) Filed: May 24, 2017

(65) Prior Publication Data
US 2017/0251623 A1   Sep. 7, 2017

Related U.S. Application Data

(63) Continuation of application No. 14/589,558, filed on Jan. 5, 2015, now Pat. No. 9,706,744, which is a
(Continued)

(51) Int. Cl.
*A01J 5/007*  (2006.01)
*A01J 5/017*  (2006.01)

(52) U.S. Cl.
CPC .............. *A01J 5/017* (2013.01); *A01J 5/007* (2013.01)

(58) Field of Classification Search
CPC .................................. A01J 5/007; A01J 5/017
USPC ......... 119/14.01, 14.08, 14.18, 14.24, 14.25, 119/14.26, 14.27, 14.32, 14.34, 14.35, 119/14.02
See application file for complete search history.

(56) References Cited

U.S. PATENT DOCUMENTS 3,556,053 A   1/1971   Padman et al.
3,690,300 A   9/1972   Tonelli
(Continued)

FOREIGN PATENT DOCUMENTS

AU   519720   12/1981
DE   2554998   6/1976
(Continued)

OTHER PUBLICATIONS

PCT Invitation to Pay Additional Fees and, Where Applicable, Protest Fee, dated Aug. 20, 2012 regarding Intl. Appln. No. PCT/US2012/040396 filed Jun. 1, 2012, Aug. 20, 2012.
(Continued)

*Primary Examiner* — David Parsley
(74) *Attorney, Agent, or Firm* — Baker Botts L.L.P.

(57) ABSTRACT

A method comprises receiving a displacement signal generated by a sensor, the displacement signal generated by the sensor in response to detecting movement of a piston from a retracted position in a cylinder toward an extended position in the cylinder. The method further comprises generating, in response to receiving the displacement signal, a valve control signal to be communicated to a valve located on a vacuum line connecting a vacuum source to a vacuum port of the cylinder. The valve control signal causes the valve to move from a first position in which a vacuum pressure is applied to the cylinder via the vacuum port to a second position in which atmospheric pressure is applied to the cylinder via the vacuum port.

11 Claims, 2 Drawing Sheets

Related U.S. Application Data continuation of application No. 13/155,096, filed on Jun. 7, 2011, now Pat. No. 8,944,005.

(56) References Cited

U.S. PATENT DOCUMENTS

| | | | |
|---|---|---|---|
| 3,957,018 A | | 5/1976 | Barrett |
| 4,347,868 A | | 9/1982 | Scott |
| 4,366,831 A | | 1/1983 | Scott |
| 4,523,545 A | | 6/1985 | Kummer |
| 4,838,203 A | * | 6/1989 | Ellis .................. A01J 5/017 119/14.08 |
| 2007/0261640 A1 | | 11/2007 | Stolte et al. |

FOREIGN PATENT DOCUMENTS

| | | |
|---|---|---|
| WO | WO 2005/043985 | 5/2005 |
| WO | WO 2009/058088 | 5/2009 |

OTHER PUBLICATIONS

PCT Notification of Transmittal of the International Search Report and the Written Opinion of the International Searching Authority, or the Declaration dated Oct. 22, 2012, regarding Application No. PCT/US2012/040396 filed Jun. 1, 2012, Oct. 22, 2012.

* cited by examiner

AUTOMATED CLUSTER REMOVER

RELATED APPLICATION

This application is a continuation of U.S. Ser. No. 14/589,558 filed Jan. 5, 2015 entitled "Automated Cluster Remover," which is a continuation of U.S. Ser. No. 13/155,096, filed Jun. 7, 2011 entitled "Automated Cluster Remover" now U.S. Pat. No. 8,944,005 issued Feb. 3, 2015 the disclosure of which is hereby incorporated by reference herein.

TECHNICAL FIELD

This invention relates generally to dairy farming and more particularly to an automated cluster remover facilitating the retraction of a milking cluster after completion of the milking of a dairy livestock.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY OF THE INVENTION

According to embodiments of the present disclosure, disadvantages and problems associated with previous systems supporting dairy milking operations may be reduced or eliminated.

In certain embodiments, a system includes a cylinder and a piston, the piston positioned within the cylinder and operable to move within the cylinder from a retracted position to an extended position. The system further includes a vacuum port facilitating application of a vacuum pressure to the cylinder, the vacuum pressure resulting in a vacuum force being applied to the piston, the vacuum force causing the piston to move toward the retracted position. The system further includes a spring member configured to apply a spring force to the piston when the piston is in the retracted position, the spring force offsetting at least a portion of the vacuum force. The system further includes a sensor operable to generate a displacement signal in response to detecting movement of the piston from the retracted position toward the extended position.

Certain embodiments of the present disclosure may provide one or more technical advantages. For example, in embodiments in which the system is used to retract a milking cluster, a dairy worker pulling down on the retracted milking cluster (e.g., to attach the retracted milking cluster to the teats of a dairy livestock) may trigger the generation of the displacement signal. Because the displacement signal may cause the release of the vacuum pressure from the cylinder (allowing the piston to move from the retracted position to an extended position at which the dairy worker may attach the milking cluster to the teats of the dairy livestock), the system of the present disclosure may eliminate the need to perform a separate action (e.g., the pressing of a button or the lifting of the milking cluster) to trigger the release of the vacuum pressure. As a result, certain embodiments of the present disclosure may result in ergonomic improvements.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
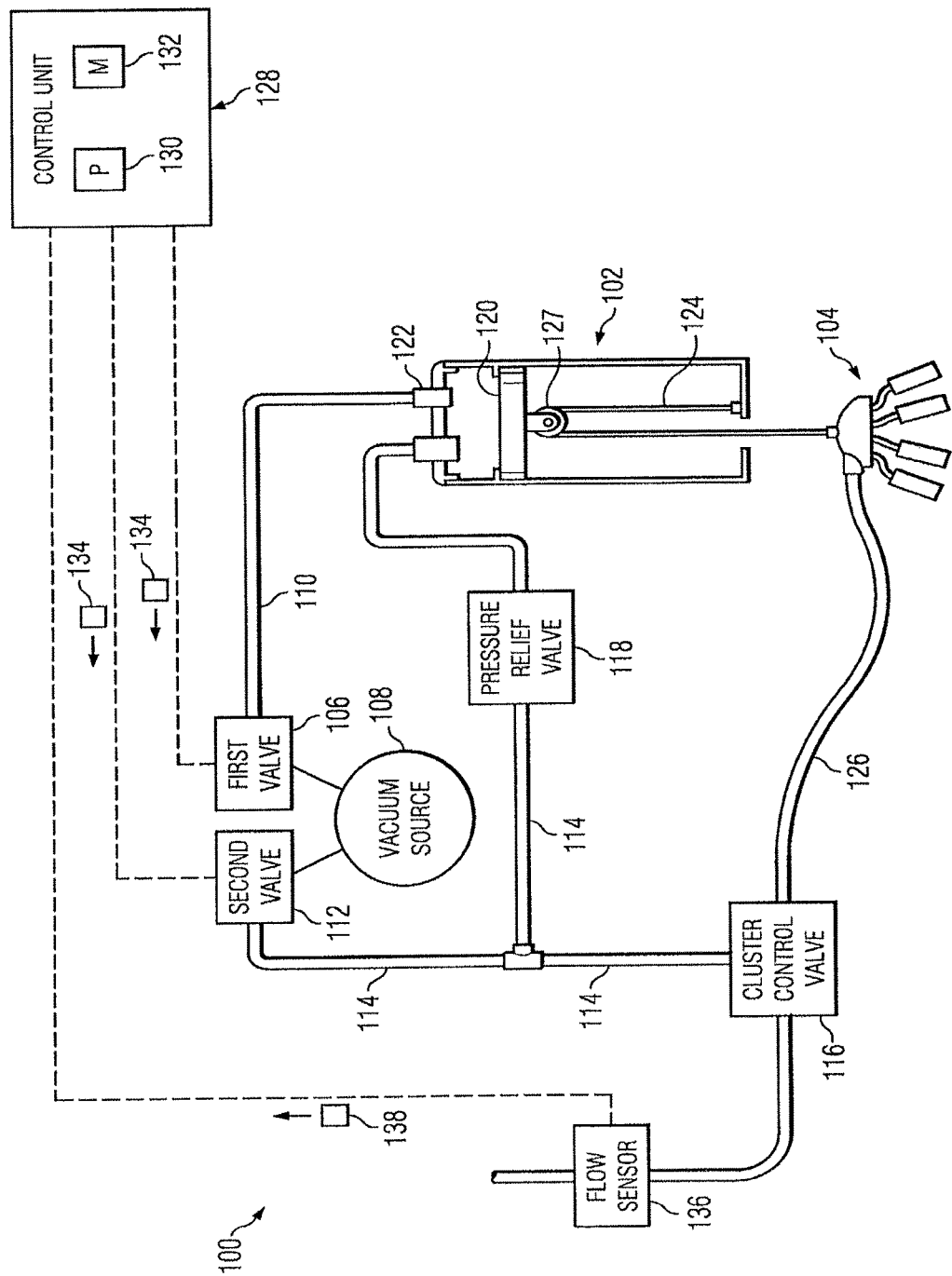
FIG. 1 illustrates an example system comprising a cylinder for retracting a milking cluster from the teats of a dairy livestock, according to certain embodiments of the present disclosure.

FIG. 1 illustrates an example system 100 comprising a cylinder 102 for retracting a milking cluster 104 from the teats of a dairy livestock, according to certain embodiments of the present disclosure. System 100 includes a first valve 106 that controls the application of vacuum pressure from a vacuum source 108 to a first vacuum line 110 connecting the first valve 106 to cylinder 102 (via a vacuum port 122, as described below). System 100 further includes a second valve 112 that controls the application of vacuum pressure from vacuum source 108 to a second vacuum line 114 connecting the second valve 112 to a cluster control valve 116 (located on a milking vacuum line 126 facilitating the application of a milking vacuum to milking cluster 104, as described below) and a pressure relief valve 118.

As described in further detail below, manipulating the pressures supplied to vacuum lines 110/114 (using valves 106/112) may facilitate (1) attachment of a milking cluster to the teats of a dairy livestock (e.g., by releasing the vacuum pressure in cylinder 102 such that milking cluster 104 may be extended to the dairy livestock), and (2) retraction of the milking cluster 104 from the teats of the dairy livestock after milking is complete (e.g., by applying a vacuum pressure to cylinder 102 such that milking cluster 104 is retracted from the dairy livestock). Although a particular implementation of system 100 is illustrated and primarily described, the present disclosure contemplates any suitable implementation of system 100, according to particular needs. Additionally, although the present disclosure contemplates system 100 facilitating the retraction of a milking cluster 104 from any suitable dairy livestock (e.g., cows, goats, sheep, water buffalo, etc.), the remainder of this description is detailed with respect dairy cows.

In certain embodiments, cylinder 102 comprises a piston 120 operable to move within cylinder 102 in response to the application of a vacuum pressure via a vacuum port 122. For example, the application of a vacuum pressure to cylinder 102 via vacuum port 122 may cause a vacuum force to be imparted on piston 120, the vacuum force causing piston 120 to move toward/remain at a retracted position with cylinder 102 (a position toward the top of cylinder 102 when oriented as depicted in FIG. 1). Conversely, the absence of the application of a vacuum pressure to cylinder 102 via vacuum port 122 (e.g., the application of atmospheric pressure to cylinder 102 via vacuum port 122) may allow piston 120 to move to an extended position (a position toward the bottom of cylinder 102 when oriented as depicted in FIG. 1).

Because a cord 124 (e.g., a rope, chain, wire, or other suitable connector) may connect piston 120 to milking cluster 104, the above-described movement of piston 120 within cylinder 102 may result in corresponding movement of milking cluster 104. For example, movement of piston 120 toward the extended position may allow milking cluster 104 to be extended beneath a dairy cow such that the milking cluster 104 may be attached to the teats of the dairy cow (e.g., in preparation for milking the dairy cow), while movement of piston 120 toward the retracted position may cause milking cluster 104 to be retracted away from the teats of a dairy cow (e.g., after milking of the dairy cow is complete). In certain embodiments, cord 124 may be coupled to piston 120 by passing through pulley 127 and being anchored to cylinder 102. As a result, the amount of movement imparted on milking cluster 104 may be more than the actual movement of piston 120.

First valve 106 and second valve 112 may each comprise any suitable valve configured to control the application of a vacuum pressure from vacuum source 108 to first vacuum line 110 and second vacuum line 114, respectively. For example, each valve may comprise an electronic, pneumatic, or other suitable valve that is operable to move from a first position in which vacuum pressure from vacuum source 108 is supplied to the corresponding vacuum line to a second position in which atmospheric pressure is supplied to the corresponding vacuum line (e.g., by opening a port to draw in ambient air from the surroundings). In certain embodiments, first valve 106 and second valve 112 may each move from the first position to the second position in response to a signal from control unit 128 (as described below). As a particular example, first valve 106 and second valve 112 may each comprise a 3/2 valve, and each may be incorporated into a single component of system 100 (e.g., a "pulsator" device).

When vacuum pressure is supplied to first vacuum line 110 (i.e., when first valve 106 is in the first position), the vacuum pressure may be supplied to cylinder 102 via vacuum port 122. The vacuum pressure, when supplied to the sealed interior portion of cylinder 102, may cause a vacuum force to be applied to piston 120, the vacuum force causing piston 120 to move toward/remain at a retracted position with cylinder 102 (a position toward to the top of cylinder 102 when oriented as depicted in FIG. 1). When atmospheric pressure is supplied to first vacuum line 110 (i.e., when first valve 106 is in the second position), the vacuum force on piston 120 may be relieved, allowing piston 120 to be drawn from a retracted position to an extended position (e.g., by drawing ambient air through first valve 106 and into the interior portion of cylinder 102).

When vacuum pressure is supplied to second vacuum line 114 (i.e., when second valve 112 is in the first position), the vacuum pressure may be supplied to both a cluster control valve 116 and a pressure relief valve 118. Conversely, when atmospheric pressure is supplied to second vacuum line 114 (i.e., when second valve 112 is in the second position), the atmospheric pressure may be supplied to both cluster control valve 116 and pressure relief valve 118. Cluster control valve 116 and pressure relief valve 118 may each comprise any suitable valve operable to move from a closed position to an open position in response to the application of a vacuum pressure (or vice versa). For example, cluster control valve 116 and pressure relief valve 118 may each comprise diaphragm valves that are open in response to the application of a vacuum pressure and closed in the absence of a vacuum pressure.

Cluster control valve 116, in response to the application of a vacuum pressure via second vacuum line 114, may move to an open position in which a milking vacuum from a milking vacuum source (not shown) is supplied to milking cluster 104 via milking vacuum line 126. The milking vacuum, when applied to milking cluster 104, may facilitate the milking of a dairy cow. Conversely, cluster control valve 116, in response to the application of atmospheric pressure via second vacuum line 114, may move to a closed position in which the milking vacuum from the milking vacuum source is prevented from being applied to milking cluster 104 via milking vacuum line 126.

Pressure relief valve 118, in response to the application of a vacuum pressure via second vacuum line 114, may move to an open position in which atmospheric pressure is supplied to the interior portion of cylinder 102. Because the opening by which atmospheric pressure is supplied to the interior portion of cylinder 102 may be relatively large, pressure relief valve 118 may, when in the open position concurrently with first valve 106 being in the second position (as discussed above), reduce the resistance of drawing ambient air into cylinder 102, thereby reducing the force required to move piston 120 from a retracted position to an extended position. Conversely, pressure relief valve 118, in response to the application of atmospheric pressure via second vacuum line 114, may move to a closed position in which ambient air is prevented from reaching interior portion of cylinder 102, creating a sealed interior portion suitable for the application of a vacuum pressure via vacuum port 122 (as described above).

Below is a table specifying the above-described valve positions in system 100 when a milking cluster 104 is (1) in a retracted position (e.g., between milkings), and (2) an extended position (e.g., during milking):

| Cluster Position | Valve Positions | Result |
| --- | --- | --- |
| Retracted (e.g., between milkings) | First valve 106 is in the first position such that vacuum pressure is supplied to first vacuum line 110 | Vacuum force applied to piston 120 such that piston 120 remains at the retracted position |
| | Second valve 112 is in the second position such that atmospheric pressure is supplied to second vacuum line 114 | Cluster control valve 116 is in the closed position such that the milking vacuum is not applied to milking cluster 104<br>Pressure relief valve 118 is in the closed position such that the interior portion of cylinder 102 is sealed (allowing the vacuum force to be applied to piston 120) |
| Extended (e.g., during milking) | First valve 106 is in the second position such that atmospheric pressure is supplied to first vacuum line 110 | Vacuum force on piston 120 is released from cylinder 102 such that piston 120 (and milking cluster 104) may be drawn to the extended position |
| | Second valve 112 is in the first position such that vacuum pressure is supplied to second vacuum line 114 | Cluster control valve 116 is in the open position such that a milking vacuum may be applied to milking cluster 104 (which facilitates milking of the dairy cow)<br>Pressure relief valve 118 is in the open position such that atmospheric pressure may be applied to cylinder 102, reducing the force required to move piston 120 (and milking cluster 104) from the retracted position to the extended position |

In certain embodiments, first valve 106 and second valve 112 may each include or be configured to communicate with (via wireless or wireline communication) a control unit 128. For purposes of simplicity, the remainder of this description will be described with reference to a single control unit 128 that serves both first valve 106 and second valve 112 to perform the function described herein.

Control unit 128 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, control unit 128 may include any suitable combination of software, firmware, and hardware.

Control unit 128 may additionally include one or more processing modules 130. Processing modules 130 may each include one or more microprocessors, controllers, or any other suitable computing devices or resources and may work, either alone or with other components to provide a portion or all of the functionality described herein. Control unit 128 may additionally include (or be communicatively coupled to via wireless or wireline communication) memory 132. Memory 132 may include any memory or database module and may take the form of volatile or non-volatile memory, including, without limitation, magnetic media, optical media, random access memory (RAM), read-only memory (ROM), removable media, or any other suitable local or remote memory component.

In certain embodiments, control unit 128 may be operable to control the positions of first valve 106 and second valve 112 in unison or independently of each other (i.e., control unit 128 may control whether each should be in either the first position or the second position, as described above). To control the positions of first valve 106 and second valve 112, control unit 128 may communicate valve control signals 134 to first valve 106 and second valve 112, the valve control signals 134 causing the valves to move from the first position to the second position, or vice versa.

At a point in time in which milking cluster 104 is not attached to the teats of a dairy cow (e.g., between milkings), first valve 106 may be in the first position and second valve 112 may be in the second position (such that vacuum pressure is supplied to first vacuum line 110 and atmospheric pressure is supplied to second vacuum line 114, as described above), and milking cluster 104 may be in a retracted position. When a dairy worker desires to attach the milking cluster 104 to the teats of a dairy cow, a signal indicating that desire (e.g., a displacement signal 144 received from a sensor 140, as described below with regard to FIG. 2) be communicated to control unit 128. In response to the received signal indicating the desire of a dairy worker to attach the milking cluster 104 to the teats of a dairy cow, control unit 128 may cause first valve 106 to move from the first position to the second position and second valve 112 to move from the second position to the first position (e.g., by communicating signals 134 to the valves, as described above).

By causing first valve 106 to move from the first position to the second position and second valve 112 to move from the second position to the first position, control unit 128 may cause atmospheric pressure to be supplied to first vacuum line 110 and vacuum pressure to be supplied to second vacuum line 114. The atmospheric pressure supplied to first vacuum line 110 may allow piston 120 (as well as milking cluster 104) to be moved to an extended position by relieving the vacuum force imparted on piston 120 (as described above). The vacuum pressure supplied to second vacuum line 114 may cause (1) cluster control valve 116 to be in an open position (such that milking vacuum is supplied to milking cluster 104 via milking vacuum line 126), and (2) pressure relief valve 118 to be in an open position (such that additional air may be drawn into cylinder 102, thereby reducing the force required to move piston 120 to the extended position). As a result, a dairy worker may extend the milking cluster 104 to attach it to the teats of the dairy cow, with milking of the dairy cow being facilitated by the milking vacuum supplied to milking cluster 104.

In certain embodiments, one or both of the above-described signals 134 communicated by control unit 128 to valves 106/112 may be delayed relative to the receipt of the signal and/or one another. For example, control unit 128 may delay the communication of the signal 134 to second valve 112 in order to delay the supply of the milking vacuum pressure to milking cluster 104 (resulting from the opening of cluster control valve 116 in response to vacuum pressure being supplied to second vacuum line 114) until the milking cluster 104 has been drawn close to the teats of the dairy cow to be milked. This may help prevent debris from being drawn into milking vacuum line 126 via milking cluster 104.

At a point in time in which milking cluster 104 is attached to the teats of a dairy cow (i.e., during milking), first valve 106 may be in the second position and second valve 112 may be in the first position (such that atmospheric pressure is supplied to first vacuum line 110 and vacuum pressure is supplied to second vacuum line 114), and milking cluster 104 may be in an extended position). When milking of the dairy cow is complete, control unit 128 may receive a signal 138 indicating that the milking of the dairy cow is complete. For example, control unit 128 may receive a signal 138 from flow sensor 136 indicating that the flow rate of milk being extracted from the teats of the dairy cow is less than a predetermined amount corresponding to the end of a milking session. In response to the signal 138 indicating that the milking of the dairy cow is complete, control unit 128 may cause first valve 106 to move from the second position to the first position and second valve 112 to move from the first position to the second position (e.g., by communicating signals 134 to the valves, as described above).

By causing first valve 106 to move from the second position to the first position and second valve 112 to move from the first position to the second position, control unit 128 may cause vacuum pressure to be supplied to first vacuum line 110 and atmospheric pressure to be supplied to second vacuum line 114. The vacuum pressure supplied to first vacuum line 110 may cause piston 120 (as well as milking cluster 104) to move to the retracted position as the vacuum pressure is applied to cylinder 102 via vacuum port 122 (resulting in a vacuum force on piston 120, as described above). The atmospheric pressure supplied to second vacuum line 114 may cause (1) cluster control valve 116 to be in a closed position (such that milking vacuum is not applied to milking cluster 104), and (2) pressure relief valve 118 to be in a closed position (such that the interior portion of cylinder 102 is sealed). As a result, the milking cluster 104 may be removed from the teats of the dairy cow (due to the stopping of the supply of milking vacuum pressure to milking cluster 104) and the milking cluster 104 may be retracted away from the dairy cow (due to the vacuum force applied to piston 120 resulting from the vacuum pressure supplied to the sealed interior portion of cylinder 102)

In certain embodiments, one or both of the above-described signals 134 communicated by control unit 128 to valves 106/112 may be delayed relative to the receipt of the signal and/or one another. For example, control unit 128 may delay the communication of the signal 134 to first valve 106 in order to delay the retracting of milking cluster 104 until the milking cluster 104 has had sufficient time to fully detach from the teats of the dairy cow. This may help prevent injury to the dairy cow by preventing retraction while the milking cluster 102 is still attached to the teats of the dairy cow.

Although a particular implementation of system 100 is illustrated and primarily described, the present disclosure contemplates any suitable implementation of system 100, according to particular needs. Moreover, although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

Figure 2:
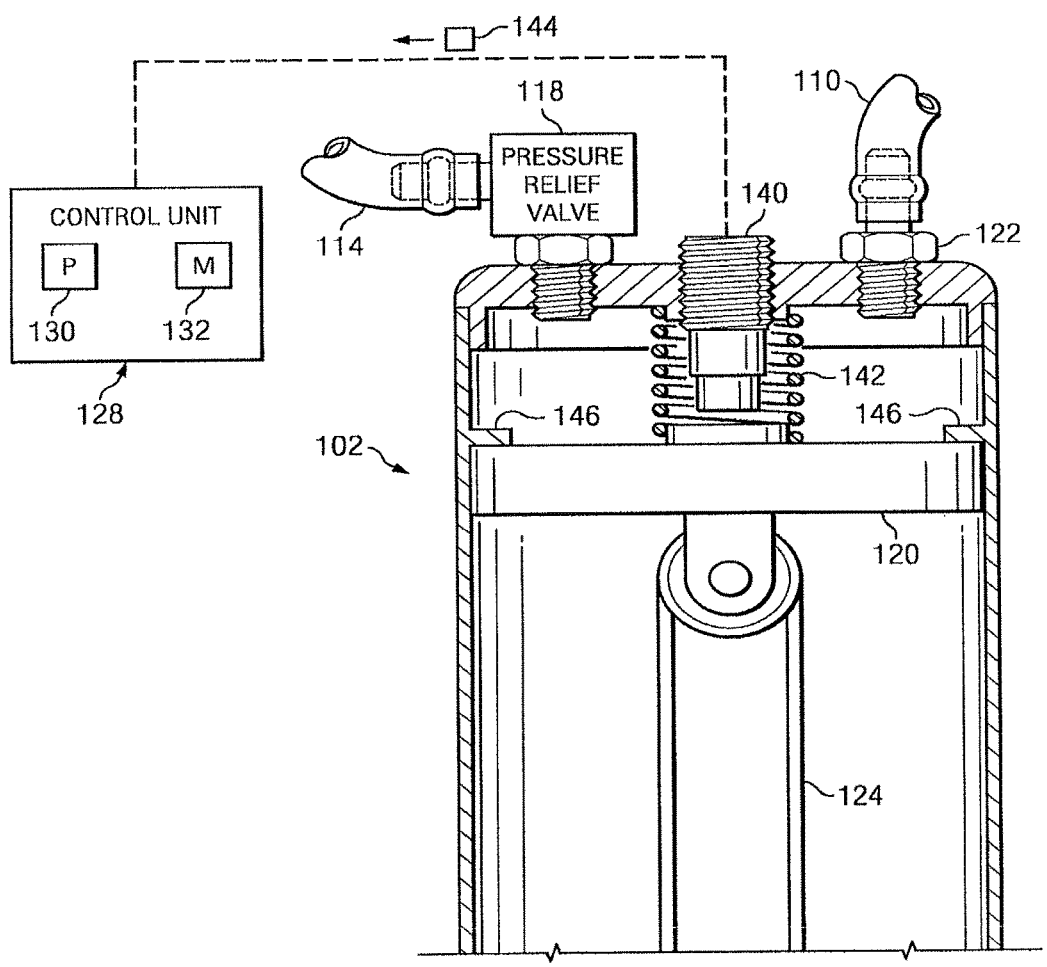
FIG. 2 illustrates a particular example of a cylinder for use in the system depicted in FIG. 1, according to certain embodiments of the present disclosure.

FIG. 2 illustrates a particular example of a cylinder 102 for use in system 100, according to certain embodiments of the present disclosure. As discussed above with regard to FIG. 1, cylinder 102 may comprise a piston 120 (e.g., coupled to a milking cluster 104 via a cord 124) and a vacuum port 122, each of which may be substantially similar to that described above with regard to FIG. 1. Additionally, cylinder 102 may comprise pressure relief valve 118 (substantially similar to that described above with regard to FIG. 1) coupled to cylinder 102, a sensor 140, and a spring member 142.

Sensor 140 may comprise any suitable sensor operable to generate a displacement signal 144 in response to detecting movement of piston 120 from the retracted position (as depicted) to an extended position. In certain embodiments, sensor 140 may comprise a proximity sensor (e.g., an inductive switch) operable to detect when a corresponding portion of piston 120 has moved more than a predetermined distance from sensor 140. For example, cylinder 102 may include stops 146 that cause piston 120, when in the fully retracted position, to be located at a first distance (e.g., approximately 2 millimeters) from sensor 140, and sensor 140 may generate a displacement signal 144 in response to detecting that piston 120 has moved to a location more than a second distance (e.g., approximately 4 millimeters) from sensor 140. In certain other embodiments, sensor 140 may comprise a contact sensor operable to detect when a corresponding portion of piston 120 is no longer in contact with sensor 140. Although particular types of sensors have been described, the present disclosure contemplates sensor 140 being any suitable sensor operable to detect movement of piston 120.

Spring member 142 may comprise any suitable member configured to offset at least a portion of the vacuum force acting on piston 120 when piston 120 is located in the retracted position (e.g., a position at which piston 120 is contacting stops 146). For example, spring member 142 may comprise a coil compression spring positioned such that spring member 142 contacts a portion of piston 120 when piston 120 is in the retracted position, thereby imparting a spring force on piston 120 that opposes the vacuum force resulting from the vacuum pressure applied to cylinder 102 via vacuum port 122. Although a particular spring member 142 positioned at a particular location within cylinder 102 is depicted and primarily described, the present disclosure contemplates any suitable spring member positioned at any suitable location within or external to cylinder 102, according to particular needs.

As described above with regard to FIG. 1, piston 120 may be in a retracted position at a point in time in which milking cluster 104 is not attached to the teats of a dairy cow (i.e., in between milkings), and piston 120 may remain in the retracted position as a result of a vacuum force acting on piston 120 (resulting from first valve 106 being in a first position and second valve 112 being in the second position, as described above). In order for a dairy worker to attach a milking cluster 104 coupled to piston 120 (via cord 124) to the teats of a dairy cow, the dairy worker may need to pull the milking cluster 104 to an extended position. The pulling of the cluster 104 may cause displacement of piston 120, which may cause sensor 140 to generate a displacement signal 144. Moreover, because spring member 142 offsets a the milking cluster 104 to cause the displacement of piston 120 may be less than the portion of the vacuum force acting on piston 120, the force required to be imparted on vacuum force acting on piston 120.

Once generated, the displacement signal 144 may be communicated to control unit 128, which, as described above with regard to FIG. 1, may cause first valve 106 to move from the first position to the second position (causing atmospheric pressure to be supplied to first vacuum line 110) and second valve 112 to move from the second position to the first position (causing vacuum pressure to be supplied to second vacuum line 114). This movement of valves 106/112 may release the vacuum force acting on piston 120 and allow the milking cluster to be pulled to the extended position (by allowing air to be drawn in to cylinder 102 via first valve 106 and pressure relief valve 118, as described above).

The above discussed configuration of cylinder 102 may provide one or more technical advantages. For example, because (1) cylinder 102 comprises a sensor 140 operable to generate a displacement signal 144 in response to detecting movement of piston 120 toward an extended position (as would result from a dairy worker pulling on milking cluster 104 in order to attach it to the teats of a dairy cow), and (2) the displacement signal 144 causes the release of the vacuum pressure from the cylinder (which may allow the dairy worker to move the milking cluster 104 to the desired location), cylinder 102 may eliminate the need to perform a separate action (e.g., the pressing of a button or the lifting of the milking cluster) to trigger the release of the vacuum pressure. As a result, certain embodiments of the present disclosure may result in ergonomic improvements.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A method, comprising:
    detecting movement of a piston from a retracted position in a cylinder toward an extended position in the cylinder;
    generating a displacement signal in response to detecting the movement of the piston, wherein the displacement signal indicates that the piston has moved from the retracted position in the cylinder toward the extended position in the cylinder;

receiving the displacement signal; and generating, in response to receiving the displacement signal, a valve control signal to be communicated to a valve located on a vacuum line connecting a vacuum source to a vacuum port of the cylinder, the valve control signal causing the valve to move from a first position in which a vacuum pressure is applied to the cylinder via the vacuum port to a second position in which atmospheric pressure is applied to the cylinder via the vacuum port.

2. The method of claim 1, further comprising causing a pressure relief valve to move from a closed position in which air is prevented from entering the cylinder via the pressure relief valve to an open position in which air is permitted to enter the cylinder via the pressure relief valve.

3. The method of claim 1, wherein application of a vacuum pressure to the cylinder results in a vacuum force being applied to the piston, the vacuum force acting toward the retracted position.

4. The method of claim 3, wherein:

the movement of the piston detected by the sensor results from a force being applied to the piston in a direction opposing the vacuum force and with a magnitude greater than the vacuum force; and the force being applied to the piston is a combination of a spring force applied to the piston by a spring member and a pulling force applied to piston via a cord attached to the piston.

5. The method of claim 1, further comprising:

receiving a signal indicating that milking of a dairy livestock is complete;

in response to receiving the signal indicating that milking of the dairy livestock is complete, causing the valve to move from the second position to the first position.

6. A method, comprising:

detecting movement of a piston from a retracted position in a cylinder toward an extended position in the cylinder;

generating a displacement signal in response to detecting the movement of the piston, wherein the displacement signal indicates that the piston has moved from the retracted position in the cylinder toward the extended position in the cylinder;

receiving the displacement signal; and generating, in response to receiving the displacement signal, a valve control signal to be communicated to a valve located on a vacuum line connecting the vacuum source to a cluster control valve, the valve control signal causing the valve located on the vacuum line to move from a second position in which atmospheric pressure is supplied to the vacuum line to a first position in which a vacuum pressure is supplied to the vacuum line.

7. The method of claim 6, wherein:

the cluster control valve is located on a milking vacuum line connecting a milking vacuum source to one or more teat cups of a milking cluster; and the vacuum pressure supplied to the vacuum line control causes the cluster control valve to move from a closed position in which a vacuum pressure is not supplied to the one or more teat cups of the milking cluster via the milking vacuum line to an open second position in which a vacuum pressure is supplied to the one or more teat cups of a milking cluster via the milking vacuum line.

8. The method of claim 6, further comprising causing a pressure relief valve connected to the vacuum line to move from a closed position in which air is prevented from entering the cylinder via the pressure relief valve to an open position in which air is permitted to enter the cylinder via the pressure relief valve.

9. The method of claim 6, wherein application of a vacuum pressure to the cylinder results in a vacuum force being applied to the piston, the vacuum force acting toward the retracted position.

10. The method of claim 9, wherein:

the movement of the piston detected by the sensor results from a force being applied to the piston in a direction opposing the vacuum force and with a magnitude greater than the vacuum force; and the force being applied to the piston is a combination of a spring force applied to the piston by a spring member and a pulling force applied to piston via a cord attached to the piston.

11. The method of claim 6, further comprising:

receiving a signal indicating that milking of a dairy livestock is complete;

in response to receiving the signal indicating that milking of the dairy livestock is complete causing the valve located on the vacuum line to move from the first position to the second position.

\* \* \* \* \*